United States Patent Office 2,704,297
Patented Mar. 15, 1955

2,704,297

ALKYLGUANYLISOUREAS

Ingenuin Hechenbleikner, Stamford, Conn., assignor to American Cyanamid Company, New York, N. Y., a corporation of Maine No Drawing. Application April 5, 1954,
Serial No. 421,167

7 Claims. (Cl. 260—564)

The present invention relates to new and useful alkylguanylisourea compounds which are capable of representation by the generic formula

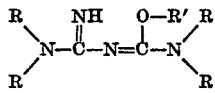

wherein R and R' are alkyl radicals having from one to eighteen carbon atoms such as methyl, ethyl, n-propyl, isopropyl, n-butyl, n-hexyl, 2-ethylhexyl, n-octyl, decyl, dodecyl, tetradecyl and octadecyl.

The new alkylguanylisoureas may be readily prepared by reacting one molar equivalent of a tetraalkylguanylchloroformamidine hydrochloride with two molar equivalents of an alkali metal alkoxide in accordance with the following equation (M is an alkali metal; R and R' have the meaning shown above):

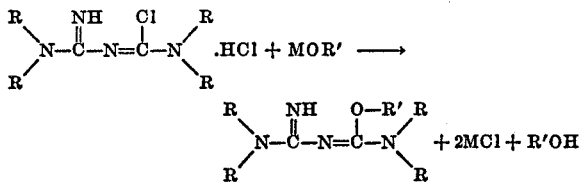

The above compounds may also be prepared by treating the tetraalkylguanylchloroformamidine hydrochloride with one molar equivalent of an alkali metal alkoxide to produce the hydrochloride salt of the alkylguanylisourea, and thereafter forming the free base by adding one molar equivalent of an alkali metal hydroxide or alkoxide.

Methods of preparing the tetraalkylguanylchloroformamidine hydrochlorides employed in the present process are disclosed in my copending application, Serial No. 358,549, filed May 29, 1953. For example, tetraethylguanylchloroformamidine hydrochloride is formed by reacting diethylcyanamide with hydrogen chloride at a temperature within the range of from 60° to 150° C. The reaction may be illustrated as follows:

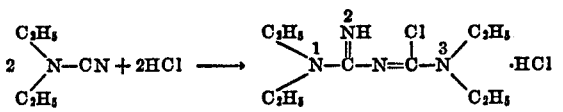

Ninety grams of hydrogen chloride was passed into 196 g. of diethylcyanamide during a period of one hour. The diethylcyanamide was stirred rapidly during the addition of the hydrogen chloride gas, and the temperature rose gradually to 85° C. The mixture was then heated for thirty minutes and the temperature was maintained at about 150° C. The product (1,1,3,3-tetraethylguanylchloroformamidine hydrochloride) was a colorless crystalline solid which melted at 35°–40° C.

In the present process the alkali metal alkoxide is formed by dissolving the alkali metal in the alcohol. The reaction of the tetraalkylguanylchloroformamidine hydrochloride with the alkali metal alkoxide is carried out in an inert organic solvent at room temperature or slightly above and usually at a temperature within the range of from about 20° C. to 50° C. Compounds which may be employed as solvents in the process are benzene, toluene, acetonitrile, tetrahydrofurane, dioxane, and the lower aliphatic monohydric alcohols such as the methyl, ethyl, propyl, and butyl alcohols.

The invention is further illustrated, but not limited, by the following examples:

EXAMPLE 1

1,1,3,3-tetramethyl-O-methylguanylisourea

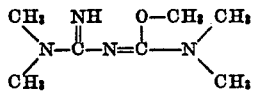

23 g. (1.0 mol) of sodium was dissolved in 400 cc. of methyl alcohol. 213 g. (1.0 mol) of tetramethylguanylchloroformamidine hydrochloride was added slowly with stirring to the methyl alcohol solution maintained at 40° C. After standing at room temperature for one hour, the reaction mixture was filtered and the filtrate was evaporated to dryness at reduced pressure. 200 g. of the 1,1,3,3-tetramethyl-O-methylguanylisourea hydrochloride was obtained which melted at 135° C. with decomposition. The free base was formed by neutralizing the hydrochloride salt with one mol equivalent of sodium hydroxide.

EXAMPLE 2

1,1,3,3-tetramethyl-O-ethylguanylisourea

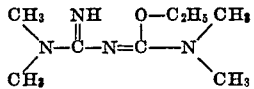

213 g. (1.0 mol) of tetramethylguanylchloroformamidine hydrochloride was added slowly with stirring to a solution of 46 g. (2.0 mols) of sodium in 400 cc. of ethyl alcohol maintained at 40°–50° C. The precipitated sodium chloride was filtered off and the filtrate was heated under vacuum to remove the alcohol. The residual product (185 g.) was a colorless oily liquid. Titration in alcohol with 0.5 N HCl gave a neutralization equivalent of 188 (calc'd., 187).

EXAMPLE 3

1,1,3,3-tetraethyl-O-isopropylguanylisourea

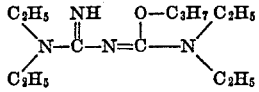

39 g. (1.0 mol) of potassium was dissolved in 500 cc. of isopropyl alcohol. 134.5 g. (0.5 mol) of tetraethylguanylchloroformamidine hydrochloride was added slowly with stirring to the alcohol solution maintained at 25°–30° C. The reaction mixture was then added to 3 liters of water. The oily product was decanted from the aqueous layer and washed with another liter of water. 214 g. of the coloress oily liquid was obtained. Titration in alcohol with 0.5 N HCl gave a neutralization equivalent of 229 (calc'd., 223).

EXAMPLE 4

1,1,3,3-tetraisobutyl-O-dodecylguanylisourea

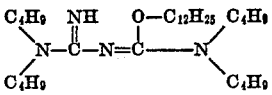

90 g. (0.2 mol) of tetraisobutylguanylchloroformamidine hydrochloride was added slowly with stirring to a solution of 7.8 g. (0.2 mol) of potassium in 37.2 g. (0.2 mol) of dodecyl alcohol and 400 cc. of benzene maintained at 40° C. for one hour. The reaction mixture was washed with 500 cc. of water containing 8 g. (0.2 mol) of sodium hydroxide. The organic layer was heated under vacuum to remove the benzene. The residual product (102 g.) was a colorless oily liquid having a neutralization equivalent of 511 (calc'd., 505).

EXAMPLE 5

1,1,3,3-tetra-n-octyl-O-n-octylguanylisourea

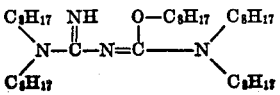

60.6 g. (0.1 mol) of tetra-n-octylguanylchloroformamidine hydrochloride was added slowly with stirring to a solution of 2.3 g. (0.1 mol) of sodium in 13 g. (0.1 mol) of n-octyl alcohol and 200 cc. of dioxane maintained at 30° C. for one hour. The reaction mixture was washed with 500 cc. of water containing 4 g. (0.1 mol) of sodium hydroxide. The oily product was decanted from the aqueous layer and dried at room temperature. 64 g. of the colorless oily liquid was obtained. Titration in alcohol with 0.5 N HCl gave a neutralization equivalent of 680 (calc'd., 674).

EXAMPLE 6

*1,1,3,3-tetradodecyl-O-octadecylguanylisourea*

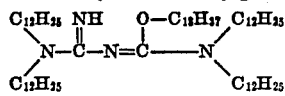

83 g. (0.1 mol) of tetradodecylguanylchloroformamidine hydrochloride was added slowly with stirring to a solution of 3.9 g. (0.1 mol) of potassium in 25.4 g. (0.12 mol) of octadecyl alcohol and 300 cc. of dioxane maintained at 35° C. for one-half hour. The reaction mixture was washed with 500 cc. of water containing 4 g. (0.1 mol) of sodium hydroxide. The oily product was decanted from the aqueous layer and dried at room temperature. 101 g. of the colorless oily liquid was obtained. The neutralization equivalent was 1010 (calc'd., 1003).

EXAMPLE 7

*1,1,3,3-tetraoctadecyl-O-n-butylguanylisourea*

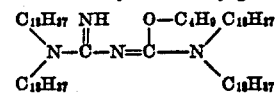

121.4 g. (0.1 mol) of tetraoctadecylguanylchloroformamidine hydrochloride was added slowly with stirring to a solution of 4.6 g. (0.2 mol) of sodium in 150 cc. of n-butyl alcohol maintained at 45° C. The reaction mixture was washed with one liter of water and then heated under vacuum (100° C./15 mm.). The residual product (120 g.) was a colorless oily liquid having a neutralization equivalent of 1220 (calc'd., 1217).

The alkylguanylisourea compounds of the present invention possess good antioxidant properties and are useful as oxidation inhibitors for mineral lubricating oils of the type used in internal combustion engines. The quantity of the oxidation inhibitor to be used in the lubricating oil may vary from very small proportions on the order of 0.1% to relatively large quantities up to 5% or greater depending on the grade of mineral oil employed.

While the invention has been described with particular reference to specific embodiments, it is to be understood that it is not to be limited thereto but is to be construed broadly and restricted solely by the scope of the appended claims.

I claim:
1. An alkylguanylisourea of the formula

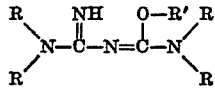

wherein R and R' are members of the group consisting of alkyl radicals having from one to eighteen carbon atoms.

2. 1,1,3,3-tetramethyl-O-ethylguanylisourea.
3. 1,1,3,3-tetraisobutyl-O-dodecylguanylisourea.
4. 1,1,3,3-tetra-n-octyl-O-n-octylguanylisourea.
5. 1,1,3,3-tetradodecyl-O-octadecylguanylisourea.
6. 1,1,3,3-tetraoctadecyl-O-n-butylguanylisourea.
7. A method of preparing an alkylguanylisourea of the formula

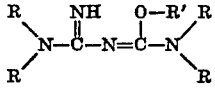

wherein R and R' are members of the group consisting of alkyl radicals having from one to eighteen carbon atoms, which comprises reacting one molar equivalent of a tetraalkylguanylchloroformamidine hydrochloride of the formula

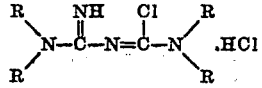

in which R has the above meaning, with two molar equivalents of an alkali metal alkoxide of the formula

MOR' in which M stands for an alkali metal and R' has the above meaning, in an inert organic solvent at a temperature within the range of from about 20° C. to 50° C., and recovering the thus-formed alkylguanylisourea from the reaction mixture.

No references cited.